United States Patent [19]

Harmon et al.

[11] Patent Number: 4,949,570

[45] Date of Patent: Aug. 21, 1990

[54] METHOD AND APPARATUS FOR CALIBRATING AGRICULTURAL GRANULAR MATERIAL APPLICATORS

[75] Inventors: David Harmon, Machesney Park; Winston H. Hines, Davis Junction, both of Ill.

[73] Assignee: American Cyanamid Company, Stamford, Conn.

[21] Appl. No.: 288,473

[22] Filed: Dec. 22, 1988

[51] Int. Cl.$^5$ ............................................. G01F 25/00
[52] U.S. Cl. ........................................... 73/3; 73/865.9
[58] Field of Search ............... 73/1 R, 3, 865.9, 866.4, 73/861

[56] References Cited

U.S. PATENT DOCUMENTS

| | | | |
|---|---|---|---|
| 2,664,907 | 1/1954 | Lowe | 73/1 R X |
| 4,331,262 | 5/1982 | Snyder et al. | 73/3 X |
| 4,663,960 | 5/1987 | Makkink | 73/3 |
| 4,667,503 | 5/1987 | Loos | 73/3 |
| 4,693,122 | 9/1987 | Griffith | 73/3 X |

FOREIGN PATENT DOCUMENTS 2161282  1/1986  United Kingdom ..................... 73/3

*Primary Examiner*—Tom Noland
*Attorney, Agent, or Firm*—Mark P. Stone

[57] ABSTRACT

The method and apparatus of the present invention enables a farmer or other agricultural worker to conveniently and efficiently calibrate the rate at which a granular material, particularly a granular pesticide, is dispensed from an agricultural planter. A stationary calibration unit has a motor and a rotatable shaft. The rotatable shaft is insertable into a pesticide dispenser forming part of the agricultural planter. Rotation of the shaft simulates movement of the agricultural vehicle carrying the planter in the field to determine the rate at which a granular pesticide is dispensed. The dispensing rate may thereafter be adjusted to a desired value and checked by again running the motor of the stationary unit to simulate field conditions. The calibration unit enables adjustment and recalibration of the dispensing rate of granular pesticide from an agricultural planter without the necessity and burden of performing trial and error field measurements and adjustments.

20 Claims, 1 Drawing Sheet

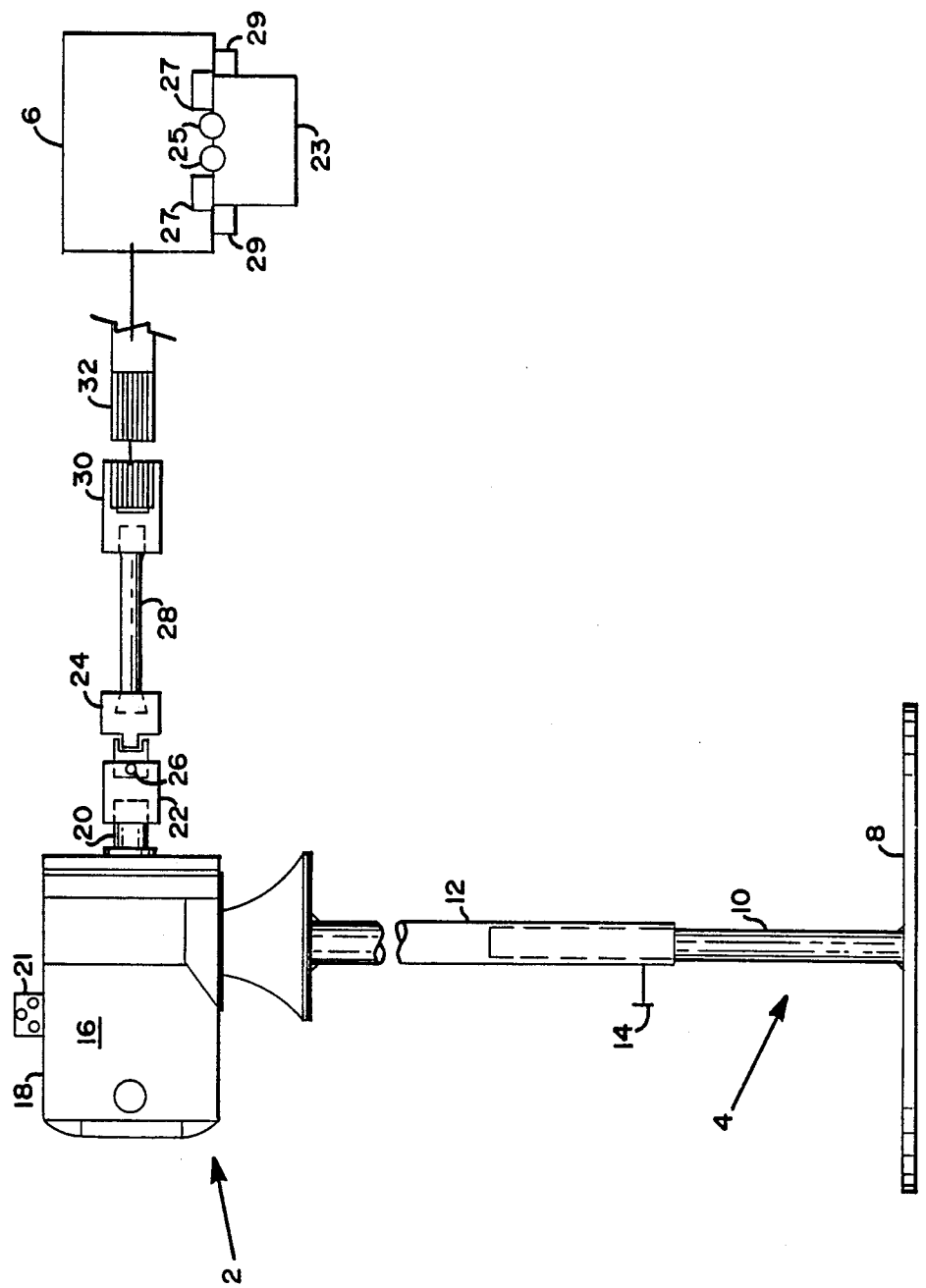

METHOD AND APPARATUS FOR CALIBRATING AGRICULTURAL GRANULAR MATERIAL APPLICATORS

BACKGROUND OF THE INVENTION

The present invention is directed to an improved method and apparatus for calibrating and adjusting the quantity, rate, and density of granular material applied to an agricultural field by an agricultural planting device. More particualarly, the present invention provides means for readily and efficiently calibrating the rate and density of a granular chemical pesticide or insecticide applied to a field from an agricultural planter device during a planting procedure.

By way of background, and agricultural planter is a wheeled device or implement which is adapted to be towed by an agricultural vehicle such as a tractor. Agricultural planters, which are well known to those skilled in the art, physically place seed in a field as the tractor is driven over rows to be planted. The planter includes a planting mechanism which is mechanically coupled by a gear train or transmission to the axle of the planter vehicle so that the motion of the planter vehicle drives the planter mechanism when planting of seed is desired. The planter mechanism may be moved into a neutral position in which the gear train is disengaged so that the planter vehicle may be towed but seed will not be planted. The planter mechanism will be set in its neutral position when, for example, the tractor which tows the planter is driven over areas which are not to be seeded. Further information concering the operation of planter devices towed by agricultural vehicles may be obtained by reference to *The* 1988 *Long Green Line Catalog and Drawn, Integral And Unit Planters*, both of which are published by John Deere & Co., the disclosures of which are expressly incorporated by reference herein.

Planter devices of the type discussed above generally inclucde attached bins or containers for holding and applying granular material such as fertilizer, insecticide or herbicide which are typically applied to a field by the planter in conjunction with a planting operation. The bins containing the granular materials are coupled to the planter vehicle axle by mechanical means, such as a gear train or transmission which is selectively coupled to the rotation of the axle of the planter vehicle, to dispense the granular material as desired during the seeding procedure. The individual bins containing fertilizer, insecticide, herbicide or other granular material may be independently coupled to the axle of the planter vehicle so that the different granualar materials in the different bins are applied to the field at different rates and densities. This may be accomplished, for example, by providing step-up or step-down gears in the specific gear trains coupled to the individual bins holding the different granular materials. Accordingly, the rate at which the individual materials are dispensed from the different bins may differ from one another, and may also differ from the rate at which seed is planted, even though the seed planting and granular material dispensing operations are all driven by the motion of the same planter vehicle. Further information concerning the dispensing of granular fertilizer, insecticide or herbicide from bins mounted to an agricultural planter device may be obtained by reference to *The* 1988 *Long Green Line Catalog and Drawn, Integral And Unit Planters*, both of which are expressly incorporated by reference herein.

The individual bins containing the granular material to be applied during the planting opertion include both a storage area and an application area. The granular material is moved or transferred in predetermined quantities from the storage area to the application area, as for example by a conventional rotating paddle structure or vacuum transport system driven by the movement of the planter vehicle when the gear train coupling the storage bin to the motion of the planter vehicle is in opeartive engagement. The application area of the bin includes one or more openings of predetermined dimension defined in its bottom surface. Granular material delivered from the bin storage area to the application area is dropped by gravity feed through the bottom copening in the bin and onto the field being seeded. The size of the bottom opening in the bin may be adjusted by conventional means. Accordingly, the speed at which the vehicle is driven, and the selected size of the opening in a bin containing granular material, determine the rate at which the granular material is applied to the agricultural field over which the vehicle is driven.

The density of application of the granular material, (i.e., the quantity of material applied per linear distance planted), is of significant importance to the planting operation. When granular pesticide is to be applied during a seeding operation, it is necessary for a farmer to check or adjust the density fo pesticide to be applied before it actually is applied to the field. This is commonly done by mounting collector tubes or containers beneath the bottom apertures in the bins holding the granular material, coupling the planter with the bins to a tractor, and driving the tractor a predetermined distance in the field at the speed which the tractor will be driven during the actual planting operation. The quantity of granular material dispensed from the bin and collected in the collector tube is measured, and this quantity is divided by the linear distance traveled by the tractor to calculate the density at which the granular material would have been applied to the field. If the density is not the desired value, the size of the opening in the bin is adjusted (increased if a greater density of application is required, or decreased if lesser density of application is required), and the same procedure is repeated. This laborious and time-consuming procedure may be repeated a number of times until the bin is calibrated to attain the desired rate of application and density of the granular material.

It is the object of the present invention to provide a method and apparatus for facilitating the procedure by which bins containing granular material, particularly granular pesticide to be applied during a planting operation, may be easily calibrated and adjusted to readily attain the desired density and rate of application to the field to be seeded.

SUMMARY OF THE INVENTION

In accordance with the present invention, a stationary unit includes a motor and a rotatable shaft extending from and driven by the motor. The free end of the shaft remote from the motor includes a socket which is insertable into a shaft of a planter device of the type to be towed by a tractor. Rotation of the motor drives the delivery system of the granular material conttained within each of the bins mounted to the planter device. Collecting devices are mounted beneath the bin or bins containing the granular material being dispensed, and the motor is driven at a predetermined rotational speed and for a selected time period to correspond to a predetermined distance which the planter device would have traveled at its planting speed in the field. Thereafter, the motor is turned off to halt any further delivery of the granular material from the bins, and the quantity of granular material delivered from a bin and collected in the collecting device mounted beneath the bin is measured. The quantity of collected material is divided by the linear distance the vehicle would have traveled in the field at its planting speed (which corresponds to the time period during which the motor was in operation) to calculate the density (quantity per linear distance) of the granular material that would have been applied to the field. If the calculated density requires adjustment, the delivery rates from the bins are adjusted by varying the size of the openings in the bottom surfaces, and the procedure is repeated one or more times until the delivery rate of granular material from the bins is calibrated to result in the desired density of application.

It is apparent that the calibration of the granular material delivery bins using the method and apparatus of the present invention is significantly more convenient, less time consuming, and less laborious than the actual trial and error field calibrations now employed by argricultural workers. Calibration in accordance with the present invention using the stationary calibration unit may be done in an inside environment (e.g., in a barn or shed) without having to pull the planter in the field. Moreover, calibration may be made without even connecting the planter to the tractor since the stationary unit of the present invention simulates the driving movement of the tractor. Use of the stationary calibration unit of the present invention is independent of weather conditions and weather related effects on field conditions which might affect the accuracy of a field calbiration since the calibration is done in an internal environment and not under actual field conditions. As a result of the ease of calibration using the stationary unit and the capability to calibrate and adjust the dispensing rate of granular material from the bins mounted to the planter in a controlled environment not subject to adverse field conditions, a farmer is more likely to acheive an accurate dispensing rate thereby reducing his cost of granular material. Additionally, because the calibration is made in a controlled environment without the need to actually connect the planter to a tractor, the calibration operation may be done safely and conveniently.

BRIEF DESCRIPTION OF THE DRAWINGS

The single drawing figure illustrates a right side elevational view of the stationary calibration unit in accordance with the present invention. A planter device is shown in block format.

DESCRIPTION OF THE BEST MODES FOR CARRYING OUT THE INVENTION

Referring to the drawing, the stationary calibration unit of the present invention is generally designated by the reference numeral 2. The unit is supported by a height adjustable stand generally designated by the reference numeral 4. The stationary calibration unit, as will more fully be explained below, is adapted to be mechanically coupled to an agricultural planter generally designated by the reference numeral 6.

The stand 4 includes a circular or disk-shaped base 8 to support the calibration unit on the ground. A first tube section 10 is welded at one end to the center of the upper surface fo the base 8 and extends vertically upwardly therefrom. A second tube section 12 having a slightly larger diameter than that of the first tube section 10 is mounted to the outer surface of the first tube section 10 and is slideably movable along the first tube section in telescoping relationship therewith. A locking bolt 14 is provided to selectively secure the tube sections 10 and 12 in a predetermined position relative to each other corresponding to the desired elevation of the calibration unit 2 above the ground. Preferably, the base 8 is 16" in diameter, the lower tube section 10 is 1" in diameter, the upper tube section 12 is 1-¼" in diameter and the height of the top of tube section 12 is adjustable within the range of 28-44" above the ground on which the base 8 is supported. The height of the calibration unit above the ground may be adjusted by varying the relative position between the lower and upper tube sections 10 and 12.

The calibration unit generally designated by reference numeral 2 includes an electric motor 16 enclosed within a housing 18. Preferably, the motor is one-quarter horsepower, 120 volts AC having a 29:1 gear ratio and operating at 4.6 full load amps to provide a motor speed of 60 RPM. The motor includes a conventional on and off switch and a conventional speed ajustment switch, which are designated by reference numeral 21 in the drawing.

A motor shaft 20, which is typically ¾" in diameter, extends longitudally from the front of the motor housing 18. The front end of the motor shaft 20 is connected to a coupling 22 which itself is connected to a universal joint 24 by a shear pin 26. An extension shaft 28, preferably 154" in diameter and approximately 6" in length, extends forwardly from the universal joint 24. A socket 30 is mounted to the forward end of the extension shaft 28. The socket 30 is removably mounted to the extension shaft 28 so that different sized sockets to accommodate different sized planter shafts may be selectively mounted to the end of the extension shaft 28. The socket 30 is adapted to receive a shaft 32 extending from the output of the transmission of a planter 6 which drives the deliver system of the planter.

As discussed above, the stand 4 of the calibration unit is adjustable in height. In this manner, the height of the motor 16 and its drive components may be adjusted so that the socket 30 at the forward end of the motor drive* is in axial alignment with the shaft 32 extending longitudally from the planter 6. However, in the event that precise alignment between the socket 30 and the planter shaft 32 is not possible, the universal joint 26 will compensate for misalignment between the socket and the planter shaft.

Although not shown in the drawing, a protective shield or collar may be provided to cover the front end of the motor housing and the drive components coupled thereto such that only the forward end of the rotating extension shaft is exposed to enable the removal and/or replacement of different sized sockets 30 to accommodate different sized planter shafts 32. In this manner, all rotating parts other than the small portion of the exposed front end of the extension shaft 28 are shielded to prevent inadvertent injury to the user.

In operation of the invention, the calibration unit 2 is positioned proximate to the planter 6 and oriented such that the motor shaft 20 and its coupled drive components face the shaft 32 extending from the planter. The stand 4 is then adjusted to a height such that the socket 30 is axially aligned with the shaft 32 extending from the planter 6. The planter shaft is thereafter insertably received with the socket 30. Before the motor 16 is turned on, collection means 23 are removably mounted by conventional mounting means such as brackets 29 below storage bins of the planter for delivery fo granular material such as granular pesticide. After the collection means are mounted to the delivery units of the planter, the motor 16 is turned on at a predetermined and constant rotationaly speed such as 60 RPMs. Although the motor speed is maintained at a constant rate for each calibration operation, the motor may be of variable rotational speed to simulate different planting speeds of agricultural vehicle during different calibration operations.

The motor is driven at its constant predetermined rotational speed for a selected period of time to simulate or correspond to a preselected distance the planter would have traveled in the field at its planting speed. Thereafter, the motor is turned off and the granular material deposited in the collecting means mounted to the delivery bins is removed and measured. The density of distribution or application of the granular material is calculated by dividing the measured quantity of collected granular material by the simulated preselected linear distance of travel. In the event that the calculated ratio differs from the optimum application density required by the farmer, the granular material from the collector means is placed back into the delivery pin, the collector means are remounted below the delivery bin, and the delivery rate of the granular material is increased if a greater density is required or is decreased if a lesser density is required. As discussed above, the flow rate of granular material from the delivery bins may be adjusted by varying the size of the delivery openings 25 in the bins by conventional means, as for example, members 27 which are slideable over the openings 23.

The aforementioned procedure is repeated until the calculated density of the granular material attains the desired level. At that time, the stationary calibration unit 2 is disengaged from the planter 6 by removing the socket 30 from the planter shaft 32. The calibrated planter may now be connected to a tractor and employed for planting, or may be stored for future use.

From the aforementioned discussion, it is apparent that the calibration operation is performed while the planter is disconnected from an agricultural vehicle. This procedure avoids the necessity of calibrating the planter during actual field operation. As a result, calibration may be made in a quicker, less laborious, safer and more efficient manner. Moreover, since calibration is accordance with the above-described procedure may be made indoors, the calibration operation will not be affected by adverse field or weather conditions thereby further enhancing the overall efficiency of the calibration procedure.

Modifications and variations of the present invention will become apparent to those skilled in the art. Accordingly, the above description of the best mode is intended to be illustrative only, and not restrictive of the scope of the invention, that scope being defined by the following claims and all equivalants thereto.

We claim:

1. An apparatus for calibrating the delivery rate of granular material to be applied to a field by a granular dispenser of the type driven by an agricultural vehicle, said apparatus comprising:
   a motor having a motor shaft,
   means for coupling said motor shaft to said granular dispenser for causing the delivery of said granular material from said granular dispenser,
   collector mens operatively mounted to said granular dispenser to collect said granular material delivered from said granular dispenser, and
   means for driving said motor at a predetermined speed for a preselected period of time to simulate a predetermined distance traveled by said agricultural vehichle at a predetermined planting speed.

2. The apparatus of claim 1 further including height adjustable support means for supporting said motor above a base level.

3. The apparatus of claim 2 wherein said motor shaft is coupled to a shaft extending from said granular dispenser.

4. The apparatus of claim 3 wherein motor shaft and said shaft extending from said granular dispenser are coupled by a socket disposed therebetween.

5. The apparatus of claim 4 wherein said socket is removably mounted to a free end of said motor shaft.

6. The apparatus of claim 4 wherein said motor shaft includes an extension shaft, and said socket is mounted to a free end of said extension shaft.

7. The apparatus of claim 6 wherein said motor shaft and said extension shaft are coupled by a universal joint.

8. The apparatus of claim 6 wherein said socket is removably mounted to the free end of said extension shaft.

9. The apparatus of claim 1 wherein said granular material is a granular pesticide.

10. The apparatus of claim 1 further including means for ceasing the driving of said motor after said preselected period of time has expired.

11. The apparatus of claim 1 wherein said motor shaft is coupled to the output of a transmission of said granular dispenser.

12. The apparatus of claim 1 wherein said motor is a variable speed motor and is adapted to simulate different constant planting speeds of said agricultural vehicle during different calibration operations.

13. A method of calibrating the delivery rate and density of granular material applied to a field from a granular dispenser of the type driven by an agricultural vehicle, said method comprising the steps of:
   coupling a motor to said granular dispenser,
   driving said motor at a rotational speed corresponding to a predetermined planting speed of said agricultural vehicle for a preselected period of time to simulate a predetermined distance traveled by said agricultural vehicle,
   collecting said granular material delivered by said granular dispenser during said preselected period of time, and
   measuring the quantity of said collected granular material delivered by said granular dispenser.

14. The method of claim 13 further including the step of:
   stopping said motor after said preselected period of time has expired.

15. The method of claim 14 further including the step of:
   determining the density of said granular material delivered by said granular dispenser by calculating the ratio of the measured quantity of collected granular material delivered by said granular dispenser and the simulated predetermined distance traveled by said agricultural vehicle during said preselected time period.

16. The method of claim 15 further including the step of adjusting the deliver rate of granular material from said granular dispenser to vary said density.

17. The method of claim 16 wherein said granular dispenser defines a gravity feed bottom opening for delivery of said granular material therefrom, and said delivery rate is adjusted by varying the size of said bottom opening.

18. The method of claim 13 further including the step of adjusting said speed at which said motor drives said granular dispenser to vary said simulated predetermined planting speed of said agricultural vehicle for a subsequent calibration operation.

19. The method of claim 13 wherein said granular material is collected by removably mounting a collector receptacle beneath a granular delivery opening in said granular dispenser.

20. A method of calibrating the delivery rate and density of a granular pesticide to be applied to a field from an agricultural planter, said method comprising the steps of:
coupling a motor to a granular pesticide delivery bin of said agricultural planter when said agricultural planter is in a stationary position,
driving said motor at a rotational speed to simulate a predetermined planting speed of the agricultural vehicle for a preselected time period to simulate a predetermined distance traveled by said agricultural vehicle at said simulated planting speed, and
collecting and measuring said granular pesticide discharged from said granular pesticide delivery bin during said preselected time periof for which said motor is driven to determine the density of said granular pesticide delivered over said simulated distance traveled by said agricultural vehicle.

* * * * *

UNITED STATES PATENT AND TRADEMARK OFFICE
CERTIFICATE OF CORRECTION

PATENT NO. : 4,949,570

DATED : August 21, 1990

INVENTOR(S) : David Harmon et al

It is certified that error appears in the above-identified patent and that said Letters Patent is hereby corrected as shown below:

Column 1, 2nd paragraph, Line 1: Delete "and" and substitute - -an- -.

Column 2, Line 10: Delete "opeartive" and substitute --operative--.

Column 2, Line 15: Delete "copening" and substitute - -opening- -.

Column 2, Line 27: Delete "fo" and substitute - -of- -.

Column 2, Line 63: Delete "conttained" and substitute --contained--.

Column 3, Line 35: Delete "calbiration" and substitute --calibration--.

Column 3, Line 67: Delete "fo" and substitute - -of- -.

Column 4, Line 23: Delete "ajustment" and substitute - -adjustment- -.

Column 4, Line 40: Delete "deliver" and substitute - -delivery- -.

Column 4, Line 45: Delete "*".

Column 5, Line 3: Delete "fo" and substitute - -of- -.

Column 5, Line 7: Delete "rotationaly" and substitute - -rotational- -.

Column 5, Line 11: After "of" insert - -an- -.

Column 5, Line 49: Delete "is" and substitute - -in- -.

Column 6, Line 7: Delete "vehichle" and substitute - -vehicle- -.

UNITED STATES PATENT AND TRADEMARK OFFICE
CERTIFICATE OF CORRECTION

PATENT NO. : 4,949,570

DATED : August 21, 1990

INVENTOR(S) : David Harmon et al

It is certified that error appears in the above-identified patent and that said Letters Patent is hereby corrected as shown below:

Column 7, Line 2: Delete "deliver" and substitute - -delivery- -.

Column 8, Line 15: Delete "periof" and substitute - -period- -.

Signed and Sealed this

Seventh Day of January, 1992

Attest:

HARRY F. MANBECK, JR.

*Attesting Officer*     *Commissioner of Patents and Trademarks*